United States Patent
Denisart et al.

(10) Patent No.: US 8,443,718 B2
(45) Date of Patent: May 21, 2013

(54) DEVICE FOR PREPARING A BEVERAGE WITH REMOVABLE INJECTION MEMBER

(75) Inventors: Jean-Luc Denisart, Cully (CH); Enzo Bonacci, Savigny (CH); Christian Talon, Vufflens-le-Chateau (CH); HansPeter Pleisch, Corseaux (CH)

(73) Assignee: Nestec S.A., Vevey (CH)

( * ) Notice: Subject to any disclaimer, the term of this patent is extended or adjusted under 35 U.S.C. 154(b) by 421 days.

(21) Appl. No.: 12/747,578

(22) PCT Filed: Dec. 15, 2008

(86) PCT No.: PCT/EP2008/067511
§ 371 (c)(1),
(2), (4) Date: Jun. 11, 2010

(87) PCT Pub. No.: WO2009/077489
PCT Pub. Date: Jun. 25, 2009

(65) Prior Publication Data
US 2010/0269706 A1 Oct. 28, 2010

(30) Foreign Application Priority Data
Dec. 18, 2007 (EP) .................................. 07123492

(51) Int. Cl.
*A47J 31/36* (2006.01)
(52) U.S. Cl.
USPC .......................................... 99/295; 99/302 R
(58) Field of Classification Search
USPC ................................................ 99/295, 302 R
See application file for complete search history.

(56) References Cited

U.S. PATENT DOCUMENTS

| 5,634,394 | A  | * | 6/1997  | Cortese ........................... 99/295 |
| 6,854,378 | B2 | * | 2/2005  | Jarisch et al. .................... 99/295 |
| 6,904,840 | B1 | * | 6/2005  | Pfeifer et al. .................... 99/295 |
| 7,650,831 | B2 | * | 1/2010  | Denisart et al. .................. 99/283 |
| 7,806,043 | B2 | * | 10/2010 | Zanetti ............................. 99/295 |
| 7,827,905 | B2 | * | 11/2010 | Bardazzi ...................... 99/289 R |
| 7,946,217 | B2 | * | 5/2011  | Favre et al. ...................... 99/295 |
| 2008/0134902 | A1 | * | 6/2008 | Zimmerman et al. ...... 99/302 R |

(Continued)

FOREIGN PATENT DOCUMENTS
EP 1440638 7/2004
EP 1510159 3/2005
(Continued)

OTHER PUBLICATIONS

International Search Report for Application No. PCT/EP2008/067511 dated Apr. 22, 2009, 2 pages.

*Primary Examiner* — Reginald L Alexander
(74) *Attorney, Agent, or Firm* — K&L Gates LLP

(57) ABSTRACT

The invention proposes a device for preparing a beverage from a food substance contained in a capsule by injection of a liquid into the capsule provided to the device, said device comprising an extraction head (20) having an aperture (22) for inserting a capsule (24) into a receiving chamber (25) of the device, a closing mechanism (21) to selectively enclose said capsule by a relative movement of at least two enclosing members (10, 25b), and at least one injection member (1) comprising a support member (2) and at least one injection element (3), for receiving a liquid, attached to said support member (2) which is arranged to inject liquid into a capsule (24) provided to the device, wherein the injection member (1) is releasably mounted on a support (10) at the injection side of said receiving chamber (25) by means of a releasable connection mechanism (4a, 4b, 12).

26 Claims, 5 Drawing Sheets

U.S. PATENT DOCUMENTS

2009/0255410 A1* 10/2009 Jarisch et al. ............... 99/289 R
2010/0083843 A1  4/2010 Denisart et al.
2010/0107889 A1*  5/2010 Denisart et al. ............... 99/295

FOREIGN PATENT DOCUMENTS

| | | |
|---|---|---|
| EP | 1731063 | 12/2006 |
| EP | 1774880 | 4/2007 |
| EP | 2 071 986 | 6/2009 |
| EP | 2 071 987 | 6/2009 |
| EP | 07103613.1 | 9/2009 |
| GB | 2437483 | 10/2007 |
| WO | 03059778 | 7/2003 |

* cited by examiner

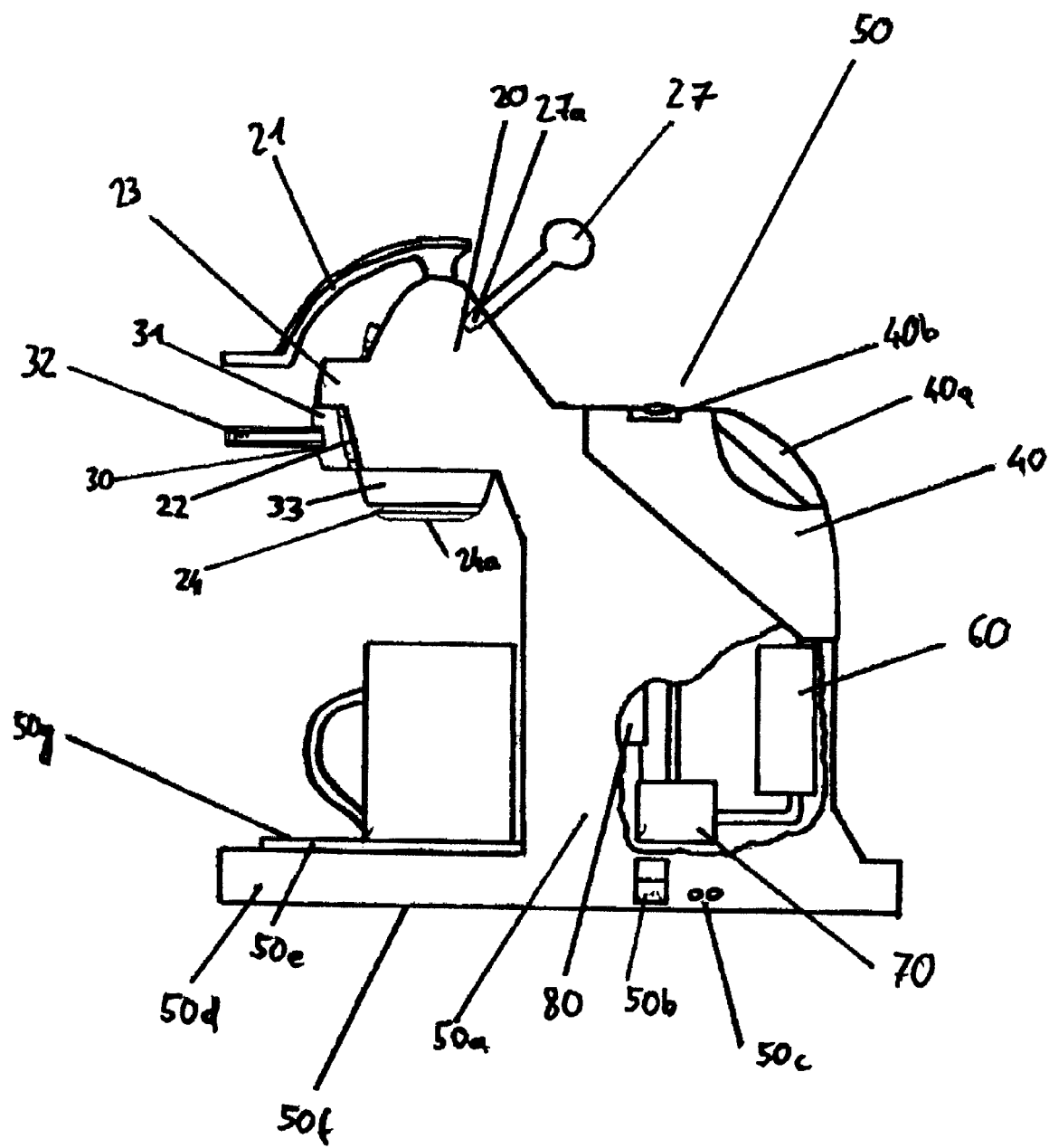

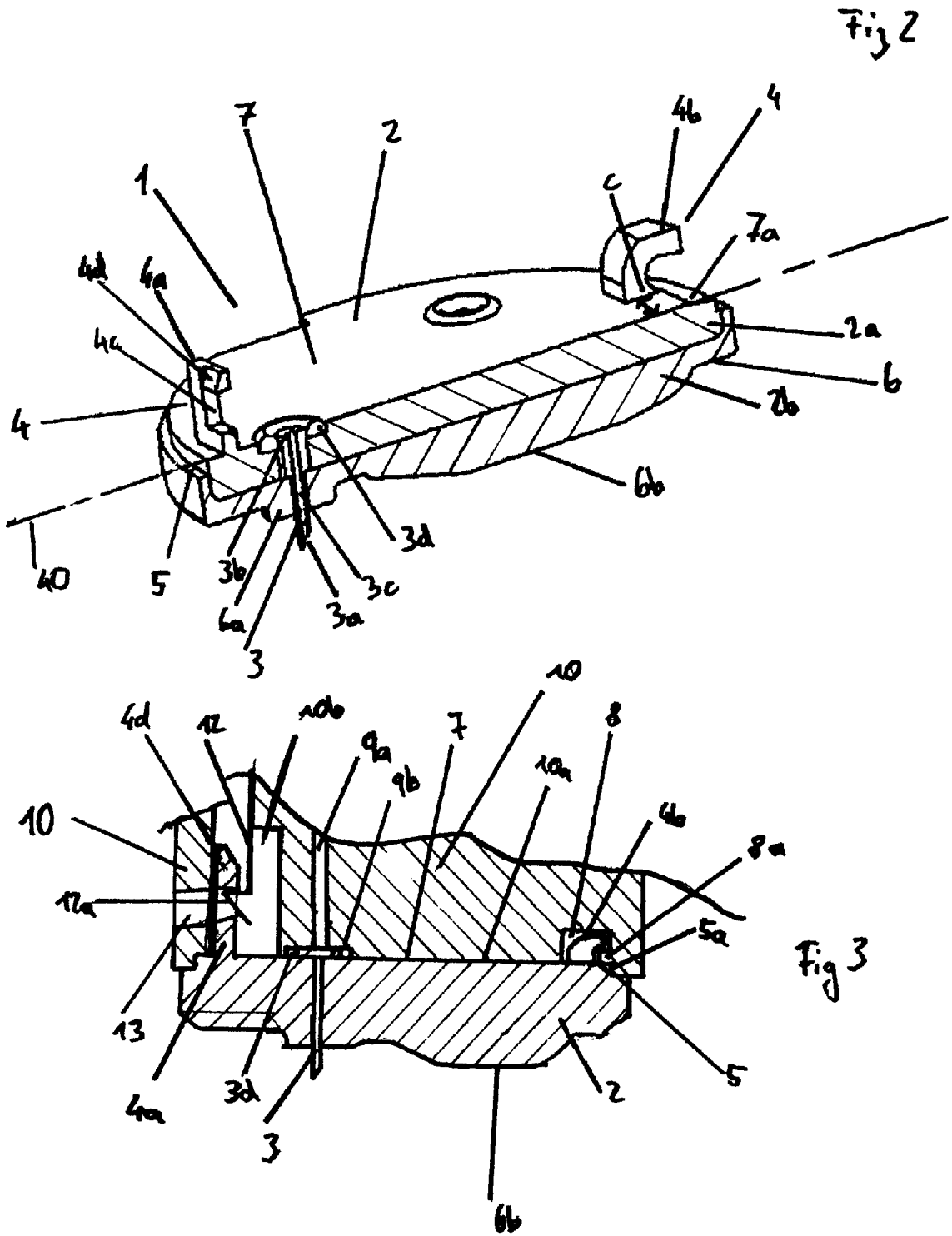

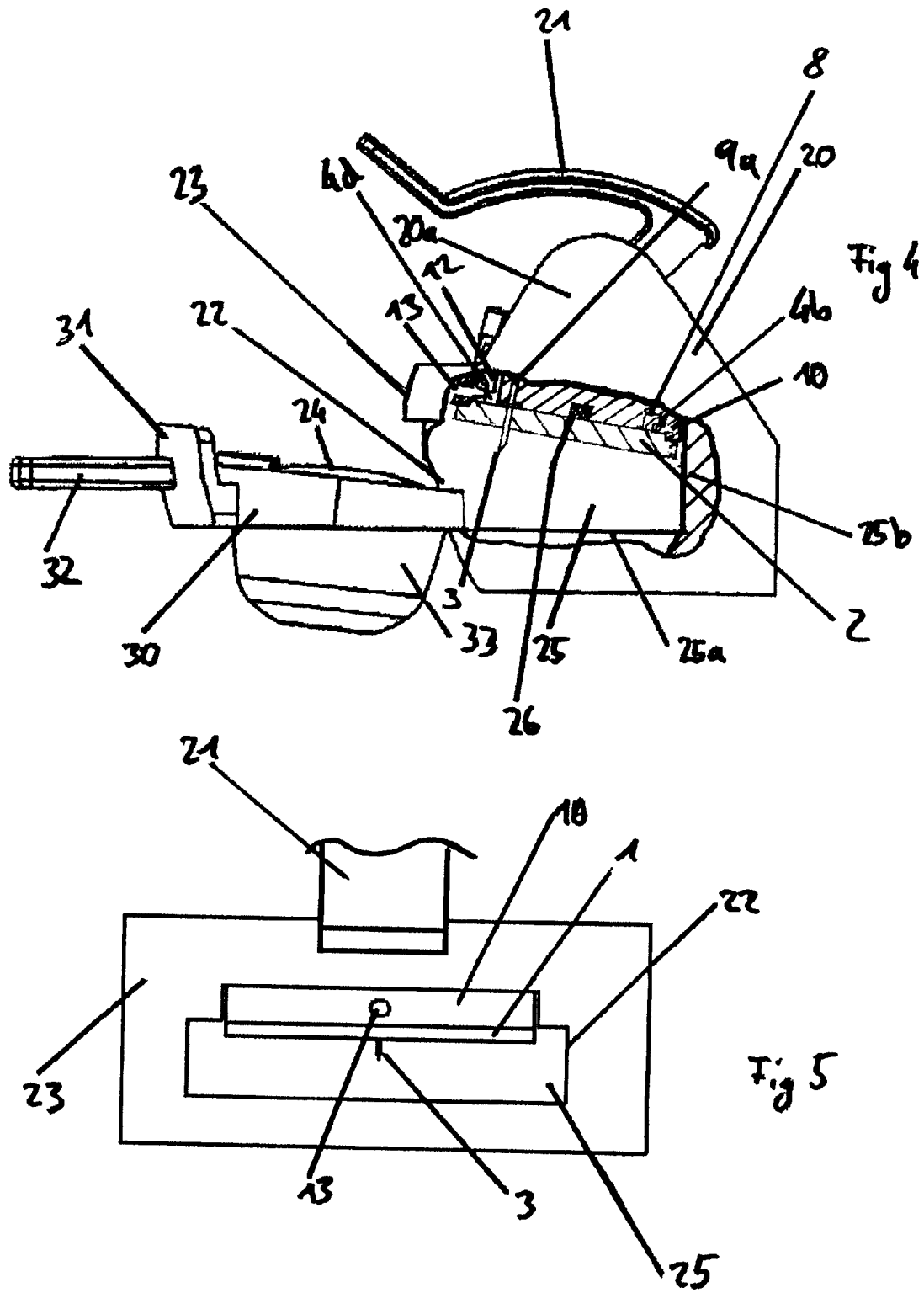

US 8,443,718 B2

DEVICE FOR PREPARING A BEVERAGE WITH REMOVABLE INJECTION MEMBER

BACKGROUND OF THE INVENTION

The present invention relates to a device for preparing a beverage from a food ingredient provided to the device within a capsule. More particularly, the invention relates to such a device comprising an improved injection member which is connected to the device in a detachable manner.

Devices for preparing a beverage by injecting pressurized fluid into a capsule are well-known, especially in the field of producing coffee or coffee type beverages. In addition, other substances such as chocolate or milk products can be extracted or dissolved to form a beverage. The advantages of such a system are in particular the conservation and freshness of the ingredients, as well as the possibility of facilitating the operations of preparing the beverage.

The method of preparing the beverages using such a device is in principle as follows. The sealed capsule is usually first inserted into a receiving chamber of the beverage preparation device. After that, a water injecting means, such as a needle connected to the liquid supply of the device and which projects inside the receiving chamber, is introduced through a face of the capsule to inject a hot or cold liquid, in order to make the liquid interact with the ingredients within the capsule. The liquid beverage resulting from this interaction is then discharged through a delivery face of the capsule. For example, the delivery face opens due to the internal pressure in the capsule generated by injecting the liquid.

It should be understood that the interaction between the liquid and the ingredients within the capsule can be e.g. dissolving, extraction, brewing or any other interaction in order to prepare a beverage by means of ingredients provided within the capsule.

As generally the devices for applying said principle of beverage production are using water for the preparation of the beverage, scaling of the device or in particular within the injection member can affect its functionality. Further, the injection member is likely to be subjected to residua of dissolved or solid substance within the capsule to be introduced, e.g. pierced or otherwise injected, such as coffee or the like. Thus, as the injection member for piercing the capsule has a small diameter, cleaning of the injection member should be regularly carried out in order to ensure a correct functioning of the injection member and particularly to prevent the injection member from being blocked by scaling or by a substance provided within a capsule to be introduced, e.g., pierced or otherwise injected, by the injection member. Hence, a design for the injection member is sought-after which enables easy maintenance and cleaning of the injection member.

In addition, it is known that the quality of the beverage to be prepared by such a device is to a great extent influenced by the injection conditions such as the flow rate and/or the angle of injection to the capsule. Depending on the substance to be dissolved or extracted from the capsule, different injection conditions may lead to best results regarding the quality and taste of the beverage. Hence, it would be of interest to provide injection members enabling different injection conditions. Therefore, with respect to a long-life cycle of the machine, an interchangeability of the injection member is desired.

EP 1440638 A1 shows beverage preparation machine for preparing a beverage from a capsule containing one or more beverage ingredients. Said machine comprises a first piercing element forming an inlet of the capsule and a second piercing element forming an outlet of the capsule to be used. The two piercing elements being formed as a single injection unit, connected to the machine in a removable way. Thus, a cleaning of the injection unit is facilitated compared to a machine where the piercing elements are fixed. However, the injection unit disclosed is provided beneath the capsule to be pierced and is not provided with a connection mechanism. Hence, an unintended removal of the injection unit may occur when the capsule is removed from the machine.

EP 1731063 A1 reveals a capsule-holder intended to be connected to a beverage preparation system comprising an injection member which extends inside a housing of the capsule-holder which houses a capsule to be provided to the beverage preparation system. However, as for security reasons, the injection member should be placed within a housing of the beverage preparation device itself. Thus, the risk of getting in contact with the injection member during the process of beverage preparation can be reduced to a minimum extent.

The present invention seeks to address the problem of providing an injection member to a beverage preparation device for the extraction and/or dissolution of ingredients provided within a capsule, which is well integrated in the device but may as well be easily removed for cleaning and maintenance purposes.

The invention also aims at other objects and particularly the solution of other problems as will appear in the rest of the present description.

OBJECT AND SUMMARY OF THE INVENTION

The invention proposes a device for preparing a beverage from a food substance contained in a capsule by injection of a liquid into the capsule provided to the device, said device comprising an extraction head having an aperture for inserting a capsule into a receiving chamber of the device, a closing mechanism to selectively enclose said capsule by a relative movement of at least two enclosing members, and at least one injection member comprising a support member and at least one injection element, for receiving a liquid, attached to said support member which is arranged to inject liquid into a capsule provided to the device, wherein the injection member is releasably mounted on a support at the injection side of said receiving chamber by means of a releasable connection mechanism.

With a device according to the present invention, it is possible to enable an interaction between liquid supplied by the device, and ingredients contained in a capsule provided to the device through an aperture at the extraction head.

In a possible mode, the internal pressure within the sealed capsule is built up due to the liquid supply to the capsule. Thereby, the injection of the liquid provided by the device takes place at an upper face of the capsule to which an injection element of the injection member of the device is introduced. The output of the beverage to be prepared takes place at the lower face of the capsule thus, enabling a direct flow of the liquid. Accordingly, a receptacle such as a cup can be placed beneath the capsule in order to receive the beverage to be prepared.

WO 03059778 relates to a possible capsule which can be used for beverage preparation with the present device. The capsule contains one or more ingredients. After the injection of liquid into the capsule, the pouring from the capsule may be delayed in order to provide sufficient time for the interaction of the liquid and the ingredients contained within the capsule. For the pouring of the beverage to be prepared from the capsule, opening means such as reliefs against an outlet membrane which open a lower wall of the capsule may be provided. These opening means interact with the pressure rise within the capsule when the liquid is injected. The capsule has amongst others the advantage that beverages can be prepared without "cross-contamination" i.e. that a first beverage to be prepared does not transmit one or more undesired characteristics such as taste, colour and/or odour to a second beverage distributed after the first. The present invention may as well apply to any other food or beverage cartridge, pod or sachet containing ingredient(s) brewed, dissolved or diluted in a beverage device according to other principles than the one described in WO 03059778. In the context of the invention, the term "capsule" is used to encompass such cartridge, pod or sachet adapted to be received in the capsule holder as well.

According to an aspect of the invention, the closing mechanism of the device has an open and a closed state. The capsule can only be inserted to or withdrawn from the aperture provided at the extraction head of the device when the closing mechanism is in an open state.

The injection member is mounted on a support at the injection side of the receiving chamber in a releasable manner. Thus, the injection element of the injection member projects downwardly into the inside of the receiving chamber. As the closing mechanism is connected to the injection member, it causes a relative movement of the injection member and the capsule. Accordingly, by usage of the closing mechanism, the capsule provided to the receiving chamber of the device can effectively be introduced, e.g., pierced by the injection member of the device. Thus, liquid can be introduced into the capsule. Preferably, the injection element is a needle.

In another preferred embodiment, the injection element is a series of injection holes forming a liquid shower at the injection side of the injection member. Moreover, the injection holes are preferably connected to a common liquid inlet at the support member via a common manifold. Accordingly, liquid supplied to the inlet of the injection member can effectively be provided to the series of injection holes by means of the common manifold connecting the inlet and the injection holes of the injection member.

Preferably, the device further comprises a pump for supplying a liquid under pressure to the capsule, and a heater for supplying hot liquid. Accordingly, a substance contained within said capsule can effectively be made to interact with the liquid in order to prepare a cold or hot beverage.

Preferably, the releasable connection mechanism for connecting the injection member to the support provided at the extraction head of the device comprises a latch mechanism. Hence, as the injection member is releasably mounted on the extraction head, a user can clean and/or descale the injection member in a convenient way. Thus, the user does not have to insert cleaning means such as a brush or a cleaning cloth into the aperture of the extraction head. Instead, the user may remove the injection member from the machine for cleaning and/or descaling purpose. The user may descale the injection member using a common water softening agent or the like. Thus, an added quality value of the device especially with regard to the cleaning process of the device is attained.

The above described embodiment is also advantageous as it enables an interchangeability of the injection member. Thus, a different injection member may be connected to the device in order to influence the injection conditions by use of a different needle element for example. Thus, it is possible to use the injection member in order to change the conditions of the injection process. For example, another injection member may be connected to the device which has a needle element of a different diameter, length and/or outlet design to influence the configuration of the flow introduced within the capsule. Preferably, the diameter and the length of the needle element can be varied in order to provide different conditions which meet certain requirements of the beverages to be prepared by the device. Of course, an injection member having more than one needle element can be connected to the extraction head using the connection mechanism as well.

Furthermore, the device is preferably equipped with a control unit which is at least connected to the pump and the heater of the device. The control unit of the device may therefore be used in order to adjust the operational parameters during the preparation of the beverage.

In a preferred embodiment, the capsule containing the ingredients for the preparation of the beverage may be provided to the device by means of a capsule-holder. The capsule-holder constitutes an enclosing member. Therefore, the capsule-holder may be inserted into the aperture of the extraction head, thus supplying a capsule to the receiving chamber within the extraction head of the device. Accordingly, the capsule can be provided to the device in a convenient way. The user of the device is therefore not obliged to insert the capsule into or remove it from the receiving chamber by hand. The risk of the user getting in contact with residua of coffee or the like within the receiving chamber is consequently minimised. The risk of burns with hot spilling liquid from the waste capsule removed from the device is also reduced. The aperture of the extraction head is formed in such a way as to receive the capsule-holder. Preferably the extraction head comprises guiding means for guiding the capsule-holder when it is inserted into the aperture of the extraction head by the user. The guiding means can be a pair of side upper and lower edges forming a "wedged" shape in the direction of insertion as described in European co-pending patent application No. 07103613.1. Thus, the capsule-holder can only be inserted in a correct way.

In a preferred embodiment of the invention, the injection member is connected from below to a support connected to a dome shaped member of the extraction head. Accordingly, the injection member is situated on the upper side of the receiving chamber within the extraction head. To connect the injection member to the extraction head, it is necessary to insert the injection member into the aperture of the extraction head and thus into the receiving chamber. Accordingly, the aperture which is designed as to receive the capsule-holder may be used for inserting and removing the injection member. Hence, there is no need for an additional aperture or slot designed at the extraction head in order to insert or remove the injection member.

Moreover, as the injection member is connected from below to the inside of the extraction head, gravity can be used in order to detach the injection member from the extraction head when the connection mechanism is released.

Furthermore, as the injection member is attached to the inside of the extraction head, the injection member is well integrated within the device for the beverage preparation and the safety handling of the device can be enhanced.

Preferably, the injection member is a ring shaped disc member. Thus, the injection member is designed as to cover an upper face of the capsule when the capsule is pierced by the needle element of the injection member. In a possible mode, the injection member comprises liquid tightness surface that engages the flexible upper surface of the capsule to create a tight seal by deformation of the upper surface of the capsule during the beverage preparation process can be achieved.

A connection mechanism which connects the injection member and the extraction head is preferably recessed into the casing of the extraction head. More preferably, the connection mechanism is recessed into the support of the extraction head to which the injection member can be connected. Hence, an unintentional usage of the connection mechanism can be prevented. Moreover, the connection mechanism is preferably located at the upper front of the support of the extraction head to which the injection member can be connected.

Preferably, the connection mechanism can be released by accessing it from outside the extraction head. Thus, a user can easily release the connection mechanism in order to disconnect the injection member from the extraction head of the device. More preferably, the connection mechanism can be released by accessing it by an aperture in the casing of the extraction head. Thus, the user can release the mechanism using a tool which enters said aperture and hence releases the connection mechanism. Accordingly, the injection member may be disconnected from the support of the extraction head due to gravity. The user may then remove the injection member through the aperture of the extraction head. When intending to reconnect the injection member to the extraction head, the user has to insert the injection member with the distal needle element facing downwardly into the receiving chamber through the aperture of the extraction head. Then, the user has to press the injection member against the upper side of the receiving chamber in order to establish a connection between the injection member and the support of the extraction head by means of the connection mechanism.

When a user intends to release the connection between the injection member and the support of the extraction head and hence, withdraw the injection member from the aperture, the user first has to bring the closing mechanism in its closed position as will be described in the following.

The aperture for accessing the connection mechanism is preferably covered by a cover member in at least one operational state of the closing mechanism of the device. Thus, a relative movement between the cover member and the aperture for accessing the connection mechanism is enabled when operating the closing mechanism of the device. More preferably, the cover member covers the aperture for accessing the connection mechanism in an open state of the closing mechanism of the device. Thus, the connection mechanism of the injection member can only be accessed when the closing mechanism is in a closed state and without a capsule holder being installed. The cover member may be a part of the extraction head such as a front cover or the like.

In a preferred embodiment, even when the closing mechanism is in a closed state, the aperture for accessing the connection mechanism cannot be accessed when the capsule-holder is provided to the aperture of the extraction head. Hence, before the closing mechanism is brought into a closed state in order to access the aperture for accessing the connection mechanism, the capsule-holder has to be removed from the aperture of the extraction head.

The advantage of such an embodiment is that the injection member cannot be disconnected when the capsule-holder is still in the aperture of the extraction head. Otherwise, the injection member would fall down onto the capsule-holder due to gravity and may block the capsule-holder from being removed from the aperture.

Furthermore, a sensor may be provided on the device in order to detect the presence of the injection member being connected to the support at the extraction head. Preferably, the sensor is situated in vicinity of the support which the injection member can be connected to. Moreover, the sensor is preferably connected to the control unit of the device. Hence, it is possible to adjust the operation of the control unit due to information transmitted to the control unit by the sensor. Accordingly, it is possible to enable an operation of the pump and/or the heater for example depending on whether a presence of the injection element is detected or not. This has the advantage that the control unit can prevent liquid from being provided to the receiving chamber when no injection member is connected to the extraction head. Thus, a user who may forget to reconnect the injection member to the device, e.g. after cleaning the injection member, and intends to prepare a beverage can be effectively prevented from unintended usage of the device.

Moreover, depending on the information transmitted by the sensor, it is possible to adjust the operational parameters of the pump and the heater for example in order to influence the beverage preparation with respect to the temperature, flow rate or the pressure of the liquid to be supplied to the capsule. Of course, other parameters can be adjusted by the control unit due to the information transmitted by the sensor as well.

BRIEF DESCRIPTION OF THE DRAWINGS

Further features, advantages and objects of the present invention will become apparent for the skilled person when reading the following detailed description of embodiments of the present invention, when taken in conjunction with the figures of the enclosed drawings.

FIG. 1 shows a device for beverage preparation according to the present invention in side view.

FIG. 2 shows a perspective sectional drawing of a preferred embodiment of the injection member of the device.

FIG. 3 shows a sectional drawing of a preferred embodiment of the injection member when being connected to the device by means of the connection mechanism.

FIG. 4 shows an extraction head of the machine in side view having an aperture for introducing a capsule-holder and the injection member.

FIG. 5 shows a front view of a preferred embodiment of the aperture and the front cover of the extraction head when being in a closed operational position.

DETAILED DESCRIPTION OF EMBODIMENTS

Figure 6:
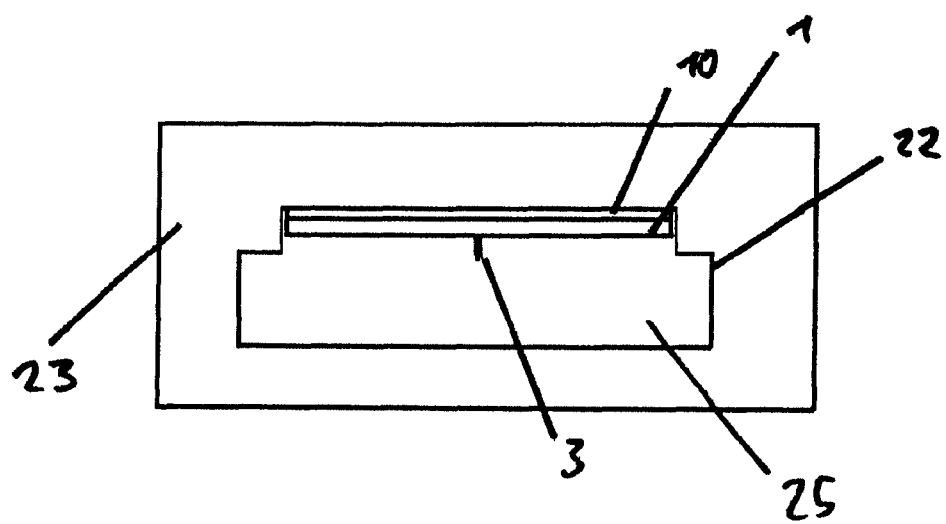
FIG. 6 shows a front view of a preferred embodiment of the aperture and the front cover of the extraction head when being in an open operational position.

FIG. 1 shows a beverage preparation device 50 according to the present invention in side view. The device 50 comprises a housing 50a containing at least a heater 60, a pump 70 and control means 80. Further the device comprises a reservoir 40 connected to the device, an extraction head 20 and a base 50f which is preferably provided with feet for standing the device thereon in a stable manner. The device further comprises a stand 50d for a receptacle such as a cup having an upper surface 50e provided with a grid 50g on which the receptacle is positioned.

The reservoir 40 is provided in order to supply liquid such as water to the heater 60 and the pump 70, and hence to the extraction head 20 and the injection member 10 (not shown in FIG. 1) of the device 50. Preferably, the reservoir 40 is connected to the device in a detachable manner and has an inlet 40b in order to insert liquid. It is preferably provided with a handhold 40a for facilitating the handling of the reservoir 40. Thus a user can handle the reservoir 40 in a convenient way. An outlet 40c which is preferably situated at the bottom of the reservoir 40 enables a connection between the reservoir 40 and the device 50.

Note that in addition or as an alternative, instead of the integrated reservoir 40 also an external water supply can be provided.

The extraction head 20 of the device comprises a closing mechanism 21 for selectively enclosing a capsule 24 provided to the device 50 and a control lever 27 for selectively supply either cold or hot water to the extraction head 20 and hence to the capsule 24. Thereby, the control lever 27 is connected at least to the control means 80 of the device 50. Hence, the control lever 27 may be switched over from a neutral position to a first position choosing hot water or to a second position choosing cold water by moving the control lever 27 to the left or to the right when seen in front-rear direction of the device 50. Accordingly, a user can choose whether to provide cold or hot water to the capsule provided to the device in order to prepare a cold or hot beverage. For enabling the movement of the control lever 27 the housing 50a of the device 50 provides a groove 27a at the extraction head 20 of the device.

As can be seen in FIG. 1, a capsule-holder 30 is inserted into an aperture 22 of the extraction head 20 in order to provide a capsule 24 housed by holding means 33 for receiving the capsule 24 to the receiving chamber 25 (not shown in FIG. 1) of the extraction head 20. The holding means 33 for receiving the capsule 24 are designed such that a beverage delivery portion 24a, e.g., an outlet port, of the capsule 24 is not enclosed. When introducing liquid into the capsule 24, a self-opening lower face opens in the capsule due to the pressure rise within the capsule 24 and hence provides the beverage to for example a receptacle placed underneath the capsule 24. Furthermore, a handhold 32 is connected to the capsule-holder 30 in order to enable a convenient handling of the capsule-holder 30. Furthermore, the capsule-holder 30 is furnished with a front cover 31, which covers the aperture 22 when the capsule-holder 30 is inserted into said aperture 22.

The device further comprises a main switch 50b and a plurality of control indicators 50c which may inform the user about the operating status of the device 50.

FIG. 2 shows a preferred embodiment of an injection member 1 in a perspective sectional side view. The injection member 1 comprises a support member 2 which is preferably disc-shaped and of a metal such as aluminium alloy, inox or plastic material. In a preferred embodiment which is shown in FIG. 2, the support member 2 consists of two disc shaped members 2a and 2b. Said two disc-shaped members 2a and 2b are arranged concentrically and preferably permanently connected to each other. The two disc-shaped members 2a, 2b may be of different materials.

The support member 2 comprises an upper face 7 and a lower face 6. The upper face 7 has preferably a plane surface. The upper and lower face 7 and 6 may be parallel to each other. As shown in FIG. 2, a part 6b of the lower face 6 may as well be convex or protruding downwardly from the lower face 6. Thus, a capsule placed beneath such a lower face 6 according to FIG. 2 can effectively be slightly compressed when in the brewing position. Moreover, the shown embodiment of the lower face 6 having such a protruding part 6b enables to reduce the internal volume of the capsule placed beneath the support, in order to reduce the "whale effect" as described in co-pending European patent application No. 07103613.1 filed on 6 Mar. 2007.

The support member 2 further comprises a circular groove 5. Thus, when being connected to a support 10 of the extraction head 20, a correct fitting of the injection member 1 within said support 10 can be ensured.

The injection member 1 further comprises a needle element 3 connected to the support member 2. The needle element 3 is preferably made of stainless steel. The needle element is held in a defined position by the support member 2. It is situated in such a way to form a through channel 3c between the upper face 7 and a lower face 6 of the support member 2. The needle element 3 comprises a basal portion 3b and a distal portion 3a. The distal portion 3a of the needle element 3 protrudes from the lower face 6 perpendicular to the upper face 7 of the support member 2. It is thus designed to pierce a capsule 24, or eventually fit through an inlet port of the capsule, provided at the lower face 6 of the support member 2.

At the orifice of the basal portion 3b which is situated at the upper face 7 of the support member 2, sealing means 3d are provided. These sealing means 3b prevent leakage of the liquid supplied from the extraction head 20 to the injection member 1, when being connected to the support 10 of the extraction head 20. Preferably, the sealing means 3d comprise an o-ring or the like.

A part 6a of the lower face 6 of the support member 2 is preferably protruding towards the orifice of the distal portion 3a of the needle element 3. Thus, effective sealing of the needle element 3 and an upper face of a capsule 24 can be achieved when the needle element 3 is pierced into a capsule 24 and liquid is supplied to said capsule 24. In particular, the protruding part 6a can engage, and eventually deform downwardly, a flexible surface of the capsule to create a sealing fit between the needle element and the surface of the capsule. A fluid-tight sealing can so be created when the capsule is placed under pressure of the injected fluid since the flexible surface can well match the shape of the surface parts 6a and 6b.

Preferably, the inner diameter of the needle element 3 is less than 1 mm. More preferably, the diameter is of a capillary diameter for the delivered liquid, e.g., less than 0.3 mm. The length of the distal portion 3a protruding from the support member 2 preferably, is less than 3 mm.

Moreover, the injection member 1 comprises a releasable connection mechanism 4 which enables a connection between the injection member 1 and a support 10 of the extraction head 20 of a device for beverage preparation. The connection mechanism 4 comprises at least one hook-like member 4b which is an integral part of the support member 2 and protrudes from its upper face 7. In a preferred embodiment according to FIG. 2, two hook-like members 4b are provided to the support member 2. Thereby, the hook-like members 4b are spaced from a centreline 40 of the support member 2 at a distance c. The centreline 40 is located coplanar to the upper face 7 of the support member 2. As shown in FIG. 2, an outer part 7a of the upper face 7 which is situated between the hook-like members 4b and the circular groove 5 is slanted towards the lower face 6. Such an embodiment facilitates the connection between the hook-like 4b member and a support 10 of the extraction head 20, as the injection member 1 has to be hooked into a provided connection means of the support 10.

In addition, the connection mechanism 4 comprises a latch member 4a which is as well formed as an integral part of the support member 2 and protrudes from its upper face 7. As shown in FIG. 2, the latch member 4a and the hook-like members 4b are preferably located at opposing endings of the centreline 40 of the injection member 1. Preferably, the latch member 4a comprises an aperture 4c for connecting e.g. a protruding latch member or the like. The ending of the latch member 4a which is situated above said aperture 4c preferably comprises a slanted portion 4d for guiding a complementary latch connection member 12 of the support which is intended to be connected to the injection member 1. Thus, connection means of the extraction head 20 such as a latch member can be easily connected to the injection member 1 using said aperture 4c.

FIG. 3 shows the injection member 1 being connected to the inside of the extraction head 20 using a support 10 connected to the extraction head 20. The connection between the support 10 and the injection member 1 is established using the connection mechanism 4. Thereby, the upper face 7 of the injection member 1 abuts to a face 10a of the support 10. The circular groove 5 of the injection member 1 is fitted into a circular groove 5a formed at the inside of the support 10. This embodiment ensures a correct and centred fitting of the injection member 1 at the support 10. Of course, the groove 5 can take other shapes than circular.

A circular recess 9b is formed at the face 10a of the support 10. Said recess 9b is connected to a supply 9a housed by the support 10. When the injection member 1 is connected to the support 10, the channel 3c of the needle element 3 and the supply 9a are aligned. Thereby, the circular recess 9b is designed to house the sealing means 3d connected to the basal portion 3b of the needle element 3. Thus, efficient sealing of the supply 9a and the needle element 3 can be obtained. Accordingly, a liquid provided to the supply 9a is transferred to the channel 3c of the needle element 3. Hence, the liquid can effectively be outputted via the distal portion 3a of the needle element 3.

Furthermore, recesses 8 are provided at the face 10a of the supply 10. Said recesses 8 are formed so as to house the hook-like members 4b of the injection member 1. Thereby, a lug 8a is provided to the recess 8 in order to enable a connection of the recess 8 and the hook-like members 4b of the injection member 1 as shown in FIG. 3.

Furthermore, a latch connection member 12 is provided to an aperture 10b of the support 10 in order to establish a connection to the latch member 4a of the injection member 1. The latch member 12 can be a spring of metal such as inox material releasably mounted at the support 10. At its lower ending 12a, said latch member 12 is bent in a hook-like manner. Accordingly, the hook-like ending 12a may be connected to the aperture 4c of the latch member 4a of the injection member 1. When being connected to the hook-like ending of the latch member 12, the slanted part 4d of the latch member 4a of the injection member 1 facilitates the engagement of the hook-like ending 12a and the aperture 4c.

Moreover, an aperture 13 is provided to a side of the support 10. Said aperture 13 is preferably circular. The aperture 13 and the aperture 10b of the support 10 are connected. In a preferred embodiment according to FIG. 3, the aperture 13 is disposed so as to be at the same height as the hook-like ending 12a of the latch member 12. Thus, when the injection member 1 is connected to the support 10 as shown in FIG. 3, the aperture 13 is aligned with the aperture 4c of the latch member 4d of the injection member 1. Thus, it is possible to access the latch member 12 through the aperture 13. Accordingly, a user may release the latch member 12 by inserting a tool which fits through the aperture 13 to push the latch member inwards in order to detach the injection member 1 from the support 10.

FIG. 4 shows an extraction head 20 of a device for beverage preparation. Said extraction head 20 comprises a receiving chamber 25 at the inside of the extraction head 20 and an aperture 22 for accessing the receiving chamber 25 at its front side. The extraction head 20 further comprises a closing mechanism 21 which enables a user to selectively enclose a capsule 24 provided to the receiving chamber 25. Thereby, the closing mechanism 21 enables a relative movement of the support 10 and a rear wall 25b of the receiving chamber 25.

The support 10 is connected from below to a dome-shaped member 20a of the extraction head. When the closing mechanism 21 is activated by a user, the support 10 is lowered from an elevated open position towards guiding recesses 25a provided at the inside of the extraction head 20. Said guiding recesses 25a are designed to guide the capsule holder when sliding in the receiving chamber during its insertion and to hold a capsule-holder 30 at its correct position within the receiving chamber 25. Thus, a capsule 24 held by the capsule holder 30 can effectively be enclosed within the receiving chamber 25 by means of the closing mechanism 21.

The capsule-holder 30 comprises a housing 33 designed to receive a capsule 24. Further, the capsule-holder 30 comprises a handhold 32. The handhold 32 protrudes horizontally from the capsule-holder 30. Thus, even when the capsule-holder 30 is fully inserted into the extraction head 20, the handhold 32 can be used to withdraw the capsule-holder 30 from the aperture 22 of the extraction head 20. The capsule-holder further comprises a cover member 31 which is situated between the housing 33 and the handhold 32. When the capsule-holder 30 is fully inserted into the extraction head 20, the cover member 31 fully covers the aperture 22 of the extraction head 20, thereby enclosing the receiving chamber 25 at the inside of the extraction head 20.

FIG. 4 shows the position of the support 10 when the closing mechanism 21 is in an open state. Thus, the support 10 is situated in an elevated position compared to the closed state of the closing mechanism 21. As can be seen in the figure, the aperture 13 of the support 10 for accessing the latch member 12a of the injection member 1 is covered by a front cover member 23 of the extraction head 20, when the closing mechanism 21 is in an open state. Thus, the latch member 12a cannot be accessed when the closing mechanism 21 is in an open state. Furthermore, when a capsule-holder 30 is inserted into the aperture 22 of the extraction head 20, the aperture 13 is as well not accessible as the cover member 31 of the capsule-holder fully covers the aperture 22 of the extraction head 20. Hence, a user is only enabled to access the latch member 12a when the closing mechanism 21 is not in an open state and the capsule-holder 30 is not inserted into the aperture 22 of the extraction head 20.

When a user intends to connect the injection member 1 to the support 10 of the extraction head 20, the capsule-holder 30 has to be removed from the aperture 22 and thus from the extraction head 20 in advance. Moreover, the closing mechanism 21 of the extraction head 20 has to be brought into a closed position in order to lower the support 10 and hence connect the injection member 1 to the support 10.

Furthermore, the support 10 may be provided with a sensor 26 which detect a presence of the injection member 1 when connected to the support 10. The sensor 26 may be a proximity sensor or the like, suitable for detecting whether an injection member 1 is connected to the support 10 or not. The position of the sensor 26 may vary from the embodiment shown in FIG. 4.

Preferably, the control means 80 provide a liquid to the supply 9b housed by the support 10, by switching on the pump 70, only when a presence of an injection member 1 is detected by the sensor 26. Thus, the device can only be used for beverage preparation when an injection member 1 is connected to the support 10. Of course it may as well be possible that liquid is supplied to the supply 9b and hence to the injection member 1 when no injection member 1 is connected to the support 10.

FIG. 5 shows the front of the extraction head 20 without a capsule-holder provided to the aperture 22, when the closing mechanism 21 of the extraction head 20 is in a closed state.

Accordingly, the support 10 is in its lower position and hence, the aperture 13 for accessing the latch connection mechanism 4a,12a is accessible. Thus, in a closed state of the closing mechanism 21, the front cover member 23 of the extraction head 20 does not cover the aperture 13 for accessing the latch connection mechanism 4a,12a. Hence, a user can disconnect the injection member 1 from the support 10 by releasing the latch connection mechanism 4a,12a.

When being disconnected from the support 10 of the extraction head 20, the injection member 1 falls down into the receiving chamber 25 of the extraction head 20. After disconnecting the injection member 1, a user can then remove the injection member 1 from the receiving chamber 25.

FIG. 6 relates to the front of the extraction head 20 without a capsule-holder provided to the aperture 22 of the extraction head 20, when the closing mechanism 21 is in an open state. As can be seen from FIG. 6, in this state of the closing mechanism 21, the aperture 13 is not accessible. Thus, the injection member 1 cannot be removed as the front cover 23 of the extraction head 20 covers the aperture 13.

Accordingly, the closing mechanism ensures that the injection member 1 can only be released when the receiving chamber 25 is closed and at the same time the capsule-holder 30 has been removed before. Only under these conditions, the aperture 13 through which the latch 12a blocking the injection member 1 can be released is accessible from outside.

Thus, it is ensured that only in the closed position of the receiving chamber 25 without the capsule-holder 30 the injection member 1 can be removed. This avoids problems when a user would otherwise like to release the injection member 1 while the capsule-holder 30 has been present, which could lead to a blocking of capsule-holder 30 within the receiving chamber 25.

Figure 7:
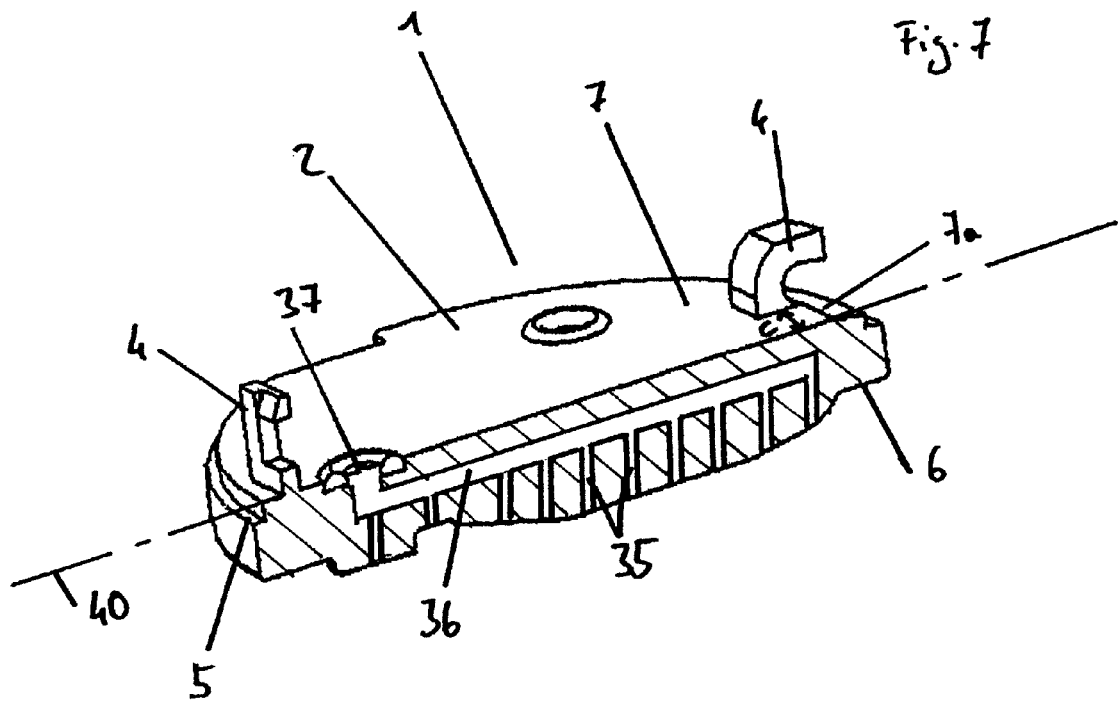
FIG. 7 shows a perspective sectional drawing of another embodiment of the injection member of the device.

In another preferred embodiment as shown in FIG. 7, the support member 2 of the injection member 1 is equipped with an injection element comprising a series of injection holes 35. Thereby, the series of injection holes 35 are connected to a common liquid inlet 37 at the support member 2 via a common manifold 36. Thus, each of the injection holes 35 is connected to the common manifold 36. Hence, liquid supplied to the inlet 37 of the injection member 1 can effectively be distributed to the series of injection holes 35 by means of the common manifold 36. Accordingly, a liquid shower can be formed by the injection holes 35 hence supplying water to a capsule or the like placed within the receiving chamber 25 of the device.

Figure 8:
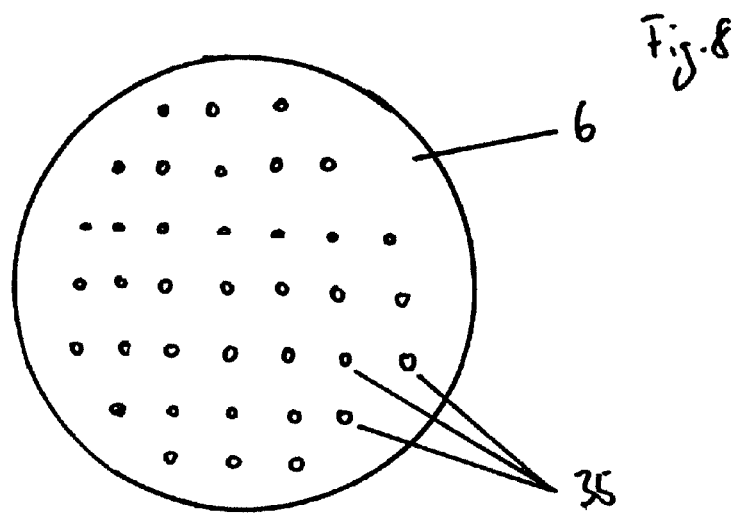
FIG. 8 shows the injection side of the injection member of FIG. 7.

As can be seen from FIG. 8, the series of injection holes 35 are disposed at the lower face 6 of the support member 2. Preferably, the series of injection holes 35 are equally distributed over the lower face 6 of the support member 2. More preferably, the holes are of the same diameter. Thereby, the quantity and the diameter of the holes 35, as well as the distance between the holes 35 can be varied in order to meet different requirements regarding the process of interaction between a liquid provided by the injection element 35 and ingredients provided e.g. by a capsule. Accordingly, it is possible to provide evenly distributed liquid over the capsule at low or medium pressure which is described in GB2437483 for example. Preferably, the liquid provided by the series of injection holes is liquid at a pressure lower than 8.5 bar. Open capsules such as filter pods or the like may be inserted into the receiving chamber 25 of the device in order to be connected to the injection member 1. Hence, the evenly distributed liquid supplied to the capsule by means of the injection holes 35 is made to interact with the ingredients contained in such an open capsule. The ingredients provided by the capsule may be for example roast or ground coffee, leaf tea, herbal tea or fruit tea or any other ingredients which can be made to interact with the liquid in order to prepare a beverage.

Although the present invention has been described with reference to preferred embodiments thereof, many modifications and alternations may be made by a person having ordinary skill in the art without departing from the scope of this invention which is defined by the appended claims. For example, it is possible to design an injection member 1 having more than one needle element 3 which may be connected by a means of a duct or the like. The pattern and design of these needle elements 3 can vary in order to meet different requirements regarding the injection conditions of the beverages to be prepared. Thereby, the injection conditions could be varied especially with regard to the dissolution and/or extraction of the substances provided within the capsules 24.

In another embodiment, it may be as well be possible to provide a sensor 26 which detects the kind of injection member 1 which is connected to the support 10. Thus, when connecting injection members of different embodiments, the sensor 26 may transmit information about the kind of injection element which is connected to the supply 10. This has the advantage that the control unit of the device may set operational parameters of the beverage preparation in response to detection of a certain injection elements. For example, an injection element designed for being best suitable for the preparation of tea can be distinguished from an injection element designed to provide best injections parameters for the preparation of coffee. Accordingly, the extraction time, the extraction pressure and/or the extraction temperature, etc. can be set depending on the identified injection element. For this purpose, it is also possible to provide an injection element which has means such as a transmitter or the like which is able to transfer information to the sensor provided at the device in order to identify the connected injection element.

In addition, the connection mechanism provided to the support of the extraction head may be used to connect other elements to the extraction head 20. It may be possible to connect an element to the support which is designed to be used for foaming milk for example. Accordingly, such an element may be connected to a second or even third supply of liquid other than the disclosed supply housed by the provided support.

The invention claimed is:

1. A device for preparing a beverage from a food substance contained in a capsule by injection of a liquid into the capsule provided to the device, the device comprising:
   an extraction head having an aperture for inserting a capsule into a receiving chamber of the device;
   a closing mechanism to selectively enclose the capsule by movement of at least two enclosing members; and
   at least one injection member comprising a support member and at least one injection element, for receiving a liquid, attached to the support member which injects liquid into a capsule provided to the device, the injection member is releasably mounted on a support at the injection side of the receiving chamber by means of a releasable connection mechanism, wherein the releasable connection mechanism comprises a latch mechanism for removably locking the injection member to the support.

2. A device according to claim 1,
   wherein the injection element is a needle which projects into the receiving chamber of the extraction head.

3. A device according to claim 1,
   wherein the injection element is a series of injection holes forming a liquid shower at the injection side of the injection member.

4. A device according to claim 3,
wherein the series of injection holes are connected to a common liquid inlet at the support member via a common manifold.

5. A device according to claim 1,
wherein the the latch mechanism comprises a latch member which is formed as an integral part of the support member.

6. A device according to claim 1,
wherein liquid is provided to the capsule by a pump of the device.

7. A device according to claim 1,
wherein the device comprises a capsule-holder for providing a capsule to the extraction head of the device, the capsule-holder is inserted into the aperture of the extraction head.

8. A device according to claim 1,
wherein the injection member is removed from or inserted into the receiving chamber of the device through an aperture of the extraction head.

9. A device according to claim 1,
wherein the injection member is connected from below to a support connected to the extraction head.

10. A device according to claim 1,
wherein the support member of the injection member is a ring shaped disc member.

11. A device according to claim 1,
wherein at least one part of the releasable connection mechanism is recessed in the support of the extraction head.

12. A device according to claim 1,
wherein the releasable connection mechanism is located at an upper front of the support of the extraction head.

13. A device according to claim 1,
wherein the connection mechanism can be released by accessing it from outside of the extraction head through an opening in the support.

14. A device according to claim 13,
wherein the closing mechanism enables relative movement between the opening of the support and a front cover member of the extraction head.

15. A device according to claim 14, wherein
the cover member covers the opening when the closing mechanism of the device is in an open state.

16. A device according to claim 13,
wherein the opening can only be accessed when a capsule-holder is not inserted in the aperture of the extraction head.

17. A device according to claim 1,
wherein a sensor means detects the presence of the injection member connected to the device.

18. A device according to claim 17,
wherein the sensor means is designed to enable an output of a liquid from the device when the presence of the injection member is detected.

19. A device according to claim 17,
wherein the sensor means is designed to enable an output of a liquid from the device when the presence of the injection member is not detected.

20. A removable injection member designed to be mounted to a system for preparing a beverage from a food substance contained in a capsule by injection of a liquid into the capsule provided by the system, the injection member comprising
a support member and at least one needle element for receiving a liquid under pressure, the injection member comprises means for a releasable connection from below to a support of such a system, and
wherein the means for connecting the injection member to the support of the system is a latch member.

21. A removable injection member according to claim 20,
wherein the support member is a ring shaped disc member.

22. A removable injection member according to claim 20,
wherein the latch member is formed as an integral part of the support.

23. A removable injection member according to any of claim 20,
wherein a convex part is designed to protrude from a lower face of the injection member in a direction that is the same as the needle element.

24. Combination of:
a device for preparing a beverage from a food substance contained in a capsule by injection of a liquid into the capsule provided to the device, the device comprising an extraction head having an aperture for inserting a capsule into a receiving chamber of the device; a closing mechanism to selectively enclose the capsule by movement of at least two enclosing members; and at least one injection member comprising a support member and at least one injection element, for receiving a liquid, attached to the support member which injects liquid into a capsule provided to the device, the injection member is releasably mounted on a support at the injection side of the receiving chamber by means of a releasable connection mechanism, wherein the releasable connection mechanism comprises a latch mechanism for removably locking the injection member to the support; and
a sealed capsule with a self opening lower face which opens due to an internal pressure provided in the capsule.

25. Combination of:
a device for preparing a beverage from a food substance contained in a capsule by injection of a liquid into the capsule provided to the device, the device comprising: an extraction head having an aperture for inserting a capsule into a receiving chamber of the device; a closing mechanism to selectively enclose the capsule by movement of at least two enclosing members; and at least one injection member comprising a support member and at least one injection element, for receiving a liquid, attached to the support member which injects liquid into a capsule provided to the device, the injection member is releasably mounted on a support at the injection side of the receiving chamber by means of a releasable connection mechanism, wherein the releasable connection mechanism comprises a latch mechanism for removably locking the injection member to the support; and
a filter pod.

26. A device for preparing a beverage from a food substance contained in a capsule by injecting liquid into the capsule comprising:
an extraction head having an aperture for allowing a capsule to be received in a chamber of the device;
a closing mechanism to enclose the capsule by relative movement of at least two enclosing members; and
at least one injection member comprising a support member and at least one injection element, for receiving a liquid, attached to said support member which is arranged to inject liquid into the capsule, the injection member is releasably mounted on a support at the injection side of the receiving member by a releasable connection mechanism, wherein the releasable connection mechanism comprises a latch mechanism for removably locking the injection member to the support.

* * * * *